United States Patent [19]
Roy et al.

[11] Patent Number: 5,811,995
[45] Date of Patent: Sep. 22, 1998

[54] CIRCUIT FOR SWITCHING BETWEEN DIFFERENT FREQUENCY CLOCK DOMAINS THAT ARE OUT OF PHASE

[75] Inventors: Rajat Roy, Sunnyvale; Jerry Kuo, San Jose; Andy P. Annadurai, Oakland, all of Calif.

[73] Assignee: Advanced Micro Devices, Inc., Sunnyvale, Calif.

[21] Appl. No.: 691,832

[22] Filed: Aug. 2, 1996

[51] Int. Cl.[6] .............................. H03K 5/13; H03K 17/00
[52] U.S. Cl. .............................. 327/99; 327/407; 327/298
[58] Field of Search .............................. 327/99, 294, 298, 327/407, 408, 293

[56] References Cited

U.S. PATENT DOCUMENTS

| | | | |
|---|---|---|---|
| 4,644,568 | 2/1987 | Canniff et al. | 327/407 |
| 4,870,299 | 9/1989 | Chen | 307/269 |
| 4,899,351 | 2/1990 | Bonke | 375/108 |
| 4,970,405 | 11/1990 | Hagiwara | 327/99 |
| 5,291,528 | 3/1994 | Vermeer | 375/106 |
| 5,315,181 | 5/1994 | Schowe | 307/480 |
| 5,357,146 | 10/1994 | Heimann | 327/298 |

FOREIGN PATENT DOCUMENTS 0 254 406   6/1987   European Pat. Off. .......... G06F 1/04

Primary Examiner—Timothy P. Callahan
Assistant Examiner—Eunja Shin
Attorney, Agent, or Firm—H. Donald Nelson

[57] ABSTRACT

A circuit and method for switching between different frequency clock domains that are out of phase. The circuit has a select input for selecting which frequency domain is to be output, a first circuit associated with the first clock domain, and a second circuit associated with the second clock domain. The first and second circuits are responsive to the select input and work together to disengage the first clock before the second clock is engaged.

8 Claims, 7 Drawing Sheets

CIRCUIT FOR SWITCHING BETWEEN DIFFERENT FREQUENCY CLOCK DOMAINS THAT ARE OUT OF PHASE

BACKGROUND OF THE INVENTION

1. Field of the Invention

This invention relates generally to a method and device for controlling the transmission of information between two or more stations and more particularly, to a method and device for switching between different clock domains that are out of phase and even more particularly, to a method and device for quickly switching between different clock domains that are out of phase within one and one half clock cycles.

2. Discussion of the Related Art

A local-area network ("LAN") is a communication system that enables personal computers, work stations, file servers, repeaters, data terminal equipment ("DTE"), and other such information processing equipment located within a limited geographical area such as an office, a building, or a cluster of buildings to electronically transfer information among one another. Each piece of information processing equipment in the LAN communicates with other information processing equipment in the LAN by following a fixed protocol (or standard) which defines the network operation.

The ISO Open Systems Interconnection Basic Reference Model defines a seven-layer model for data communications in a LAN. The lowest layer in the model is the physical layer which consists of modules that specify (a) the physical media which interconnects the network nodes and over which data is to be electronically transmitted, (b) the manner in which the network nodes interface to the physical transmission media, (c) the process for transferring data over the physical media, and (d) the protocol of the data stream.

IEEE Standard 802.3, Carrier Sense Multiple Access with Collision Detection (CSMA/CD) Access Method and Physical Layer Specifications, is one of the most widely used standards for the physical layer. Commonly referred to as Ethernet, IEEE Standard 802.3 deals with transferring data over twisted-pair cables or co-axial cables which are typically more expensive than twisted-pair cables. The 10Base-T protocol of IEEE Standard 802.3 prescribes a rate of 10 megabits/second ("Mbps") for transferring data over twisted-pair cables.

Referring to the drawings, FIG. 1 illustrates how a prior art system 10 with a workstation, personal computer, file server, data terminal equipment, or other such information processing equipment, represented by CPU 12, is connected to an ethernet 22 or other types of data communications equipment represented by the media independent interface 24. In FIG. 1, ethernet controller 14, also commonly known as a Network Interface Controller, is situated between the CPU 12 and the incoming (and outgoing) ethernet 22 lines. Typically, the ethernet 22 connection consists of two pairs of twisted-pair copper cables, an incoming pair referred to as 10R and an outgoing pair referred to as 10T.

The ethernet controller 14 is responsible for controlling the transmission of outgoing data to the outgoing pair or cable and the reception of incoming data from the incoming pair or cable. For example, before being furnished to the outgoing pair or cable, the outgoing data is Manchester encoded to reduce electromagnetic interference. The Manchester encoding causes some portions of the data stream to be pulses at 10 MHz while other portions of the data stream are pulses at 5 MHz.

The ever growing need to transfer more information faster, accompanied by increases in data processing capability, is necessitating an expansion to data transfer rates considerably higher than the 10 Mbps rate prescribed by the 10Base-T protocol. As a consequence there is a 100Base-TX protocol which extends IEEE Standard 802.3 to accommodate data moving at an effective transfer rate of 100 Mbps through twisted-pair cables of presently existing systems. There are situations in which it is desirable that the physical transmission media be capable of handling data transferred through twisted-pair cables at both the 100Base-TX rate and the lower 10Base-T rate. Presently there is a need to support a PCI speed of 33 MHz on the internal PCI bus and a need to support an ethernet speed of 25 MHz maximum for the 100 MBits per second operation in order to support the full duplex mode of operation with an interpacket gap of 0.96 microseconds.

In addition to the problems associated with the transmission of data at differing rates over the ethernet or the media independent interface, there are the problems associated with the varying data handling capabilities of the components within the personal computers, workstations, file servers, repeaters, data terminal equipment, and other such information processing equipment that make up an ethernet station.

Referring to FIG. 2, the ethernet controller 14 is responsible for controlling the transmission of data from the CPU 12 to the ethernet 22. The SRAM 16 is a 16 bit memory device, data bus 20 is a 16 bit data bus, and the PCI BUS 18 is typically a 32 bit bus. There are presently 64 bit PCI Buses and future computer systems may all have the 64 bit PCI Bus as a standard bus size.

The SRAM 16 is used as a buffer by ethernet controller 14 to prevent delays from occurring in the transmission of data either from the ethernet 22 to the CPU 12 or from the CPU 12 to the ethernet 22. Such delays could be caused, for example, by high latency in the CPU 12 or by a collision on the ethernet 22 causing a sending station to have to retransmit information that has just been sent. The various FIFOs, BX FIFO 26, MX FIFO 28, BR FIFO 30, and MR FIFO 32 are responsible for controlling the transmission of data between the various components. For example, BX FIFO 26 is responsible for receiving data from CPU 12 via PCI BUS 18, changing the format from 32 bits to 16 bits so that it can be transmitted over the 16 bit data bus 20 to SRAM 16. In addition, there is a requirement for addresses to be generated by BX FIFO 26 and MR FIFO 32 so that the information can be placed into SRAM 16 and retrieved efficiently by MX FIFO 28 and BR FIFO 30 respectively, which are responsible for changing the format from 16 bits as received from SRAM 16 into a 32 bit format.

In addition, because there is the possibility that there will be a need to receive data at the same time that there will be need to send data via ethernet 22 and also that there will be a need for the ethernet controller 14 to receive data from CPU 12 at the same time that there will be a need to send data to the CPU 12 there is a necessity for ethernet controller 14 to make intelligent choices for which data will be sent or received first and in what sequence subsequent data will be sent or received.

The ethernet controller 14 is a fast ethernet controller which contains an Expansion Bus Interface that supports two different boot devices, an EEPROM and a FLASH, as well as SRAM 16 used as a buffer extension to the internal FIFOs to buffer several packets of data for higher performance. The ethernet controller 14 supports read/write accesses to the FLASH/EEPROM while the controller is in STOP or in SUSPEND mode to store boot code. It also provides read/write diagnostic access to the SRAM 16 in STOP mode. During the STOP mode, the source of the fundamental clock to drive the Expansion Bus access cycles is the PCI clock. The PCI clock is used for these accesses because the access time for the Expansion ROM devices are programmed to be a multiple number of the PCI clock cycles. The normal SRAM 16 access takes place when the part is not in a STOP mode. At that time an external clock source can be used to drive the interface or the PCI clock or the external network clock. The selection of the clock source and the frequency for driving the SRAM interface for maximum throughput capability to support maximum wire rates in a full duplex mode or for systems with lower throughput requirements is programmable in the internal registers.

The clock sources for PCI and the external clock source can range from 2.5 to 33 MegaHertz and the external network clock can range from 10 to 20 MegaHertz. These clocks are independent and thus could be out of phase and have varied frequencies.

Initially, the part powers up in a STOP mode and the CPU or the driver software can access the FLASH device through the ethernet Expansion Bus interface. At this time the interface logic is clocked by the PCI clock running at its bus speed. After these accesses are completed the drive software resets the stop bit in the ethernet controller and the normal data transfer starts between the PCI bus and the 100 Mbits/sec wire through the SRAM 16 interface. At this time, depending upon whether a half duplex or full duplex mode is being conducted on the wire and depending upon the PCI bus speed, the clock for the SRAM 16 interface logic is selected.

To prevent delays in the transmission of data from one location to another over buses that have differing clock speeds it is critical that the system is able to switch from one clock to another with minimal delay and no glitches which result in a loss of data.

SUMMARY OF THE INVENTION

In accordance with the present invention there is described a circuit and a method of switching between an input from a first clock and an input from a second clock. The circuit has a select input for selecting which clock is to be output and a first circuit associated with the first clock and a second circuit associated with the second clock. The first and second circuits are responsive to the select input and function cooperatively to disengage the first clock from the output before the second clock is engaged to the output.

The circuit has four synchronizers and four flip-flops that work cooperatively to control the disengagement of the first clock and the engagement of the second clock to the output.

The present invention is better understood upon consideration of the detailed description below, in conjunction with the accompanying drawings. As will become readily apparent to those skilled in this art from the following description there is shown and described a preferred embodiment of this invention simply by way of illustration of the mode best suited to carry out the invention. As it will be realized, the invention is capable of other different embodiments, and its several details are capable of modifications in various, obvious aspects all without departing from the scope of the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate the present invention, and together with the description serve to explain the principles of the invention. In the drawings.

DETAILED DESCRIPTION

Figure 1:
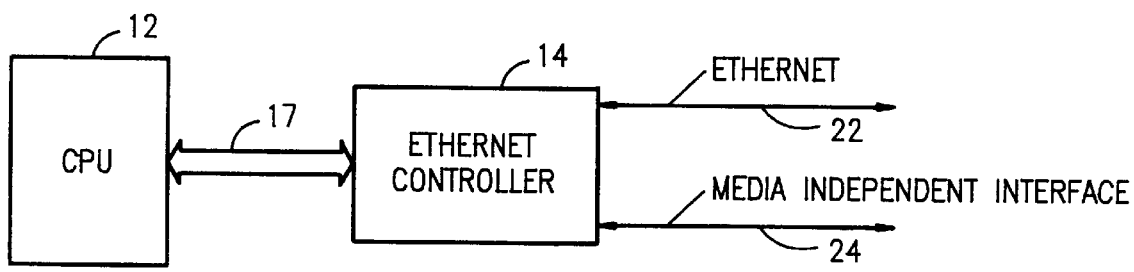
FIG. 1 shows an overall view of a prior art system with a CPU and an ethernet controller with an ethernet connection and a media independent interface connection.

Referring now to FIG. 1 there is shown an overview of a prior art system 10 with a CPU 12 and an ethernet controller 14 with connection to an ethernet 22 and a media independent interface 24. The CPU 12 is connected to the ethernet controller 14 by BUS 17.

Figure 2:
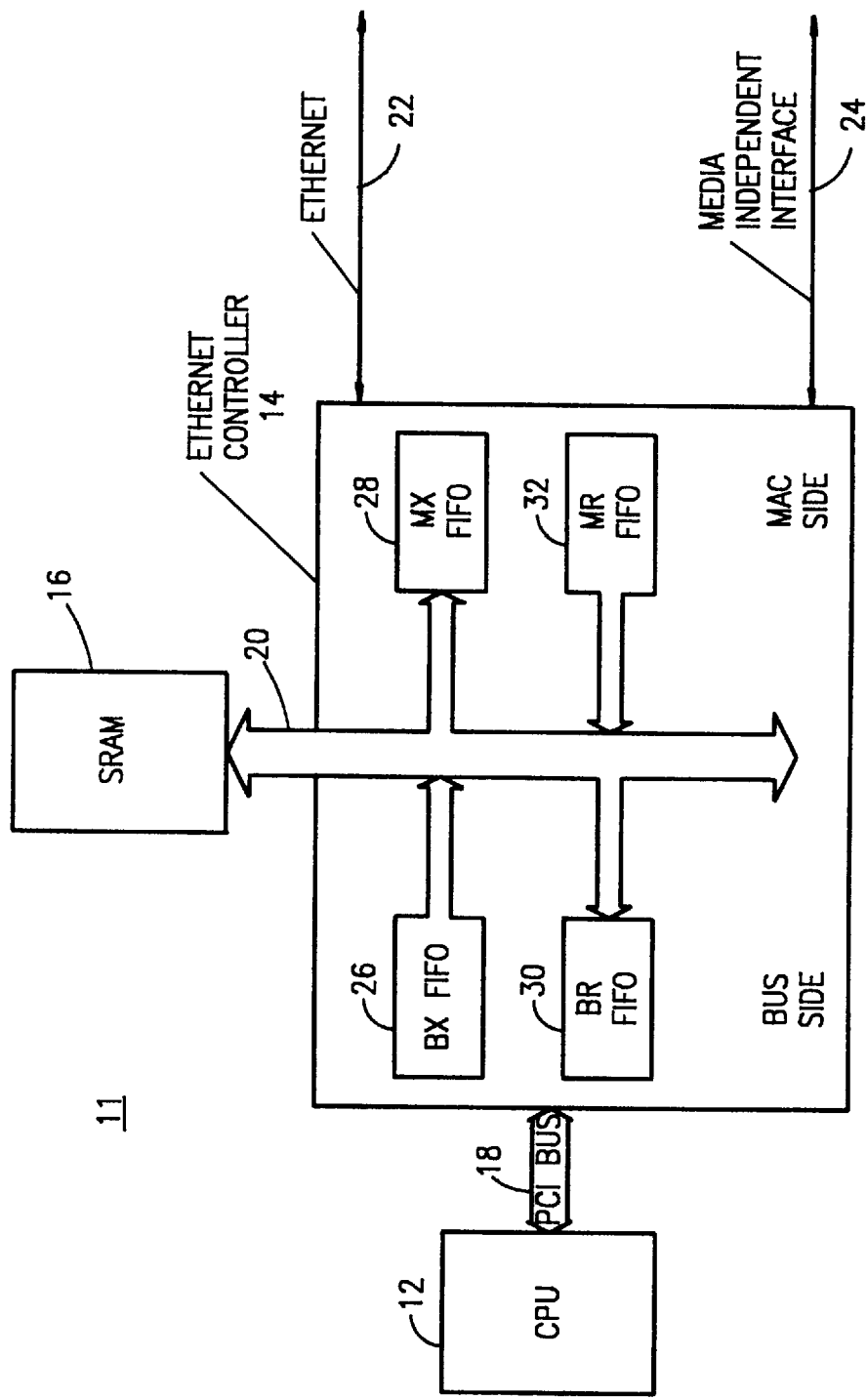
FIG. 2 shows an overall view of an ethernet controller in which the present invention is used.

Referring now to FIG. 2, there is shown a system 11 that incorporates the present invention. In this and subsequent figures like numerals will be used to denote like components. A portion of ethernet controller 14 is shown in FIG. 2. It is to be understood that the ethernet controller 14 has many other functions than the functions that are discussed in relation to the operation of the controller.

The function of the illustrated portion of the ethernet controller 14 is to manage the transmission of data to and from the ethernet 22 and/or the media independent interface 24. The ethernet controller 14 manages the transmission of data by utilizing SRAM 16 as a buffer to prevent the slowing down of the transmission of data to and from either the CPU 12 or the ethernet 22 or the media independent interface 24. There are various reasons the transmission of data can be slowed down, for example, the latency of CPU 12 can be high and the transmission of data from the ethernet 22 could be stopped until CPU 12 is freed from other interrupts. Conversely, the CPU 12 could be attempting to send data via the ethernet 22 and the ethernet 22 could be busy which would cause the data from the CPU 12 to be stopped or held until the ethernet 22 is free.

To avoid problems caused by not being able to complete the sending or the receiving of information, the ethernet controller 14 employs several methods to decrease or prevent delays. One such method is to use four FIFOs, each of which manages either an input or output function. The BX FIFO 26 manages transmission of data from CPU 12 to SRAM 16. MX FIFO 28 manages the transmission of data from SRAM 16 to the ethernet 22 or the media independent interface 24. Similarly, MR FIFO 32 manages the transmission of data from either the ethernet 22 or the media independent interface 24 and BR FIFO 30 manages the transmission of data to CPU 12. In order for the ethernet controller 14 to prevent or minimize delays in the transmission of data, the controller must be able to switch from one function to another depending upon which would be the most efficient at the time. To be able to do so without adding to the delay or losing data since the data is transmitted or received over different speed buses is a highly critical function.

Figure 3:
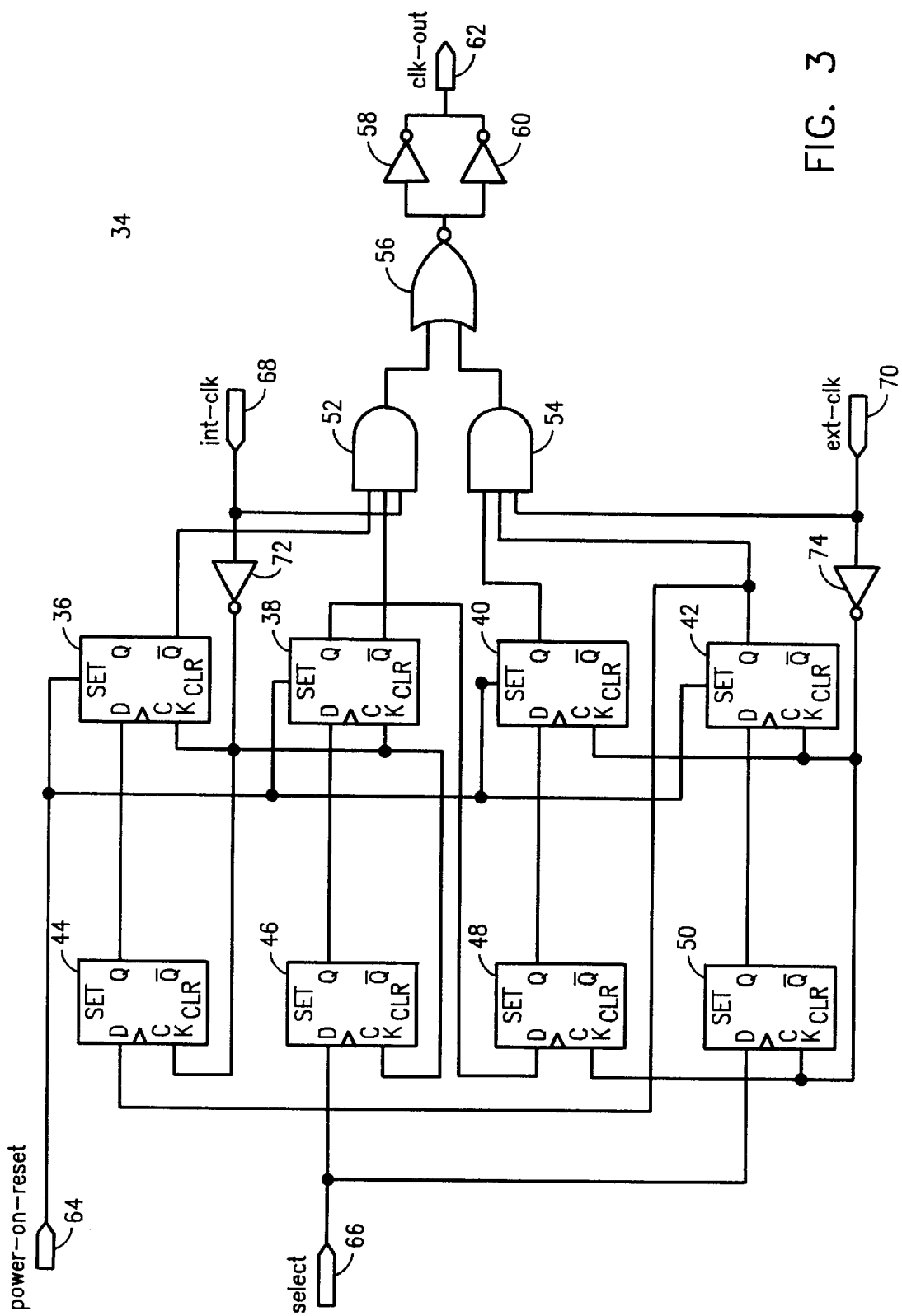
FIG. 3 shows an embodiment of the present invention.

Referring now to FIG. 3, there is shown an embodiment of a circuit for switching between clock domains as taught by the present invention. Circuit 34 comprises four synchronously setable flip-flops, four synchronizers, and one complex gate. The synchronously setable flip-flops are flip-flop 36, flip-flop 38, flip-flop 40, and flip-flop 42. The synchronizers are synchronizer 44, synchronizer 46, synchronizer 48, and synchronizer 50. The synchronizers 44, 46, 48, and 50 are characterized in that they are able to change state when an input is received as long as the clock input is high, that is, they do not have to wait until a positive edge is received at the clock input. The complex gate comprises a three input AND GATE 52, a three input AND GATE 54, a two input NOR GATE 56, and two inverters, 58 and 60, connected in parallel to the output of NOR GATE 56 and output terminal 62. There are four input signals to circuit 34. The four input signals are a power-on-reset signal 64, a select signal 66, an internal clock (int-clk) signal 68 which can be, for example, either an internal 20 MegaHertz crystal clock or an Expansion bus clock ranging from 10 to 33 MegaHertz (it is noted that it is not intended that the present invention be limited to these values, that is, the present invention would comprehend other clock rates, and an external clock (ext-clk) signal 70, for example a PCI clock source ranging from 5–33 MegaHertz (again it is noted that it is not intended that the present invention be limited to these values and that the present invention would comprehend other clock rates). The power-on-reset input 64 is input to the "set" input to flip-flop 36, flip-flop 38, flip-flop 40, and flip-flop 42. The select input 66 is input to synchronizer 46 and synchronizer 50. The internal clock input 68 is communicated to AND GATE 52 and after being inverted by inverter 72 is a clock input to synchronizer 44, synchronizer 46, flip-flop 36, and flip-flop 38. The external clock input 70 is communicated to AND GATE 54 and after being inverted by inverter 74 is a clock input to synchronizer 48, synchronizer 50, flip-flop 40, and flip-flop 42.

Synchronizer 44 has a D input from the Q output of flip-flop 42, the inverted clock input from inverter 72, and Q output communicated to the D input of flip-flop 36 which has a set input from power-on-reset 64, an inverted clock input from inverter 72 and a Q-bar output to AND GATE 52.

Synchronizer 46 has a D input from select input 66, an inverted clock input from inverter 72, and Q output communicated to the D input of flip-flop 38 which has a set input from power-on-reset 64, an inverted clock input from inverter 72, a Q output communicated to the D input of synchronizer 48, and a Q-bar output communicated to an input of AND GATE 52.

Synchronizer 48 has a D input from the Q output of flip-flop 38, an inverted clock input from inverter 74, and a Q output to the D input of flip-flop 40 which has a set input from power-on-reset 64, and a Q output to AND GATE 54.

Synchronizer 50 has a D input from select input 66, an inverted clock input from inverter 74, and a Q output to the D input of flip-flop 42 which has a set input from power-on-reset 64, an inverted clock input from inverter 74, a Q output that is communicated to the D input of synchronizer 44 and to an input of AND GATE 54.

Figure 4:
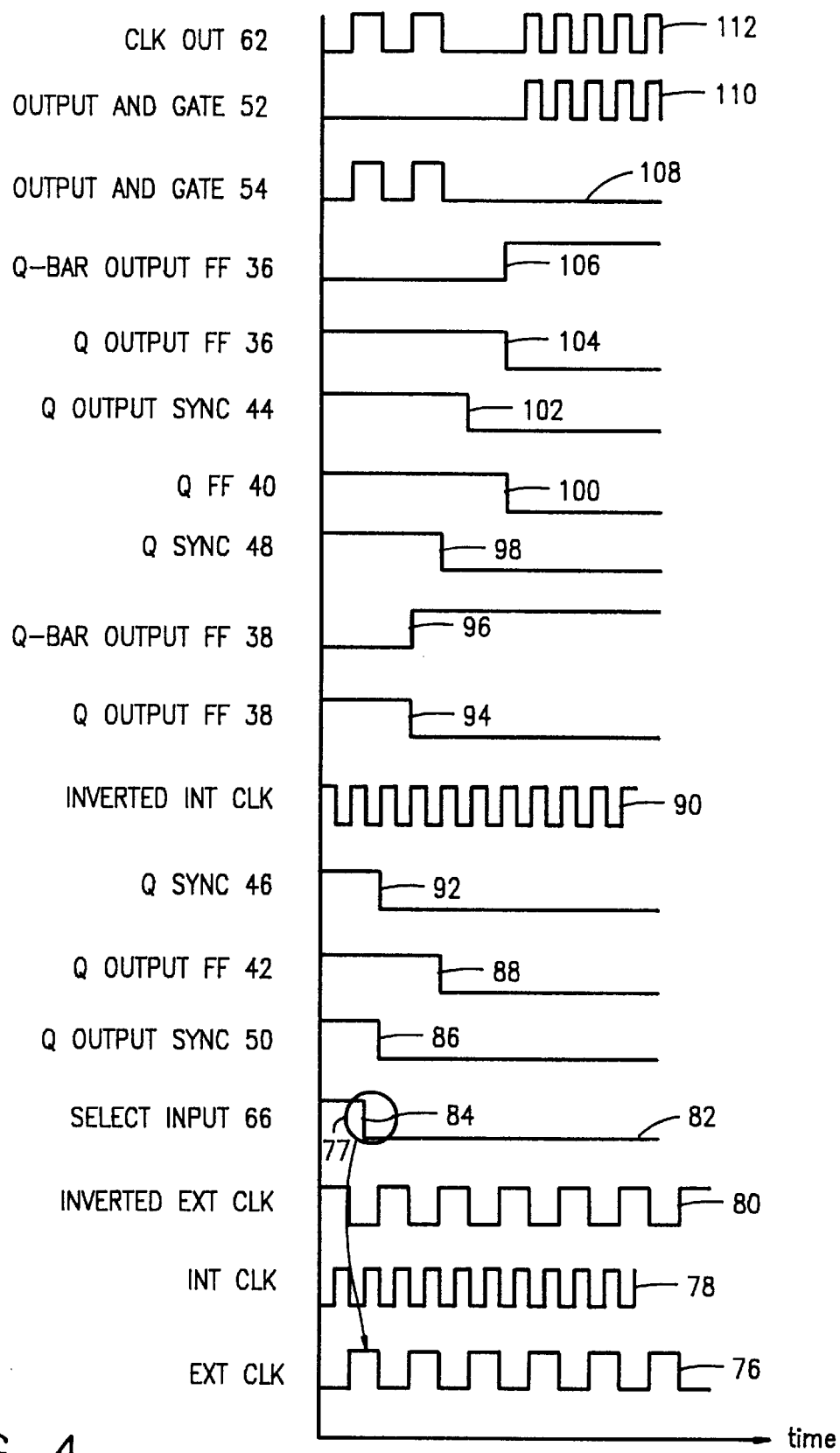
FIG. 4 shows a first timing diagram showing waveforms resulting at various locations within the embodiment of the present invention shown in FIG. 3.
Figure 5:
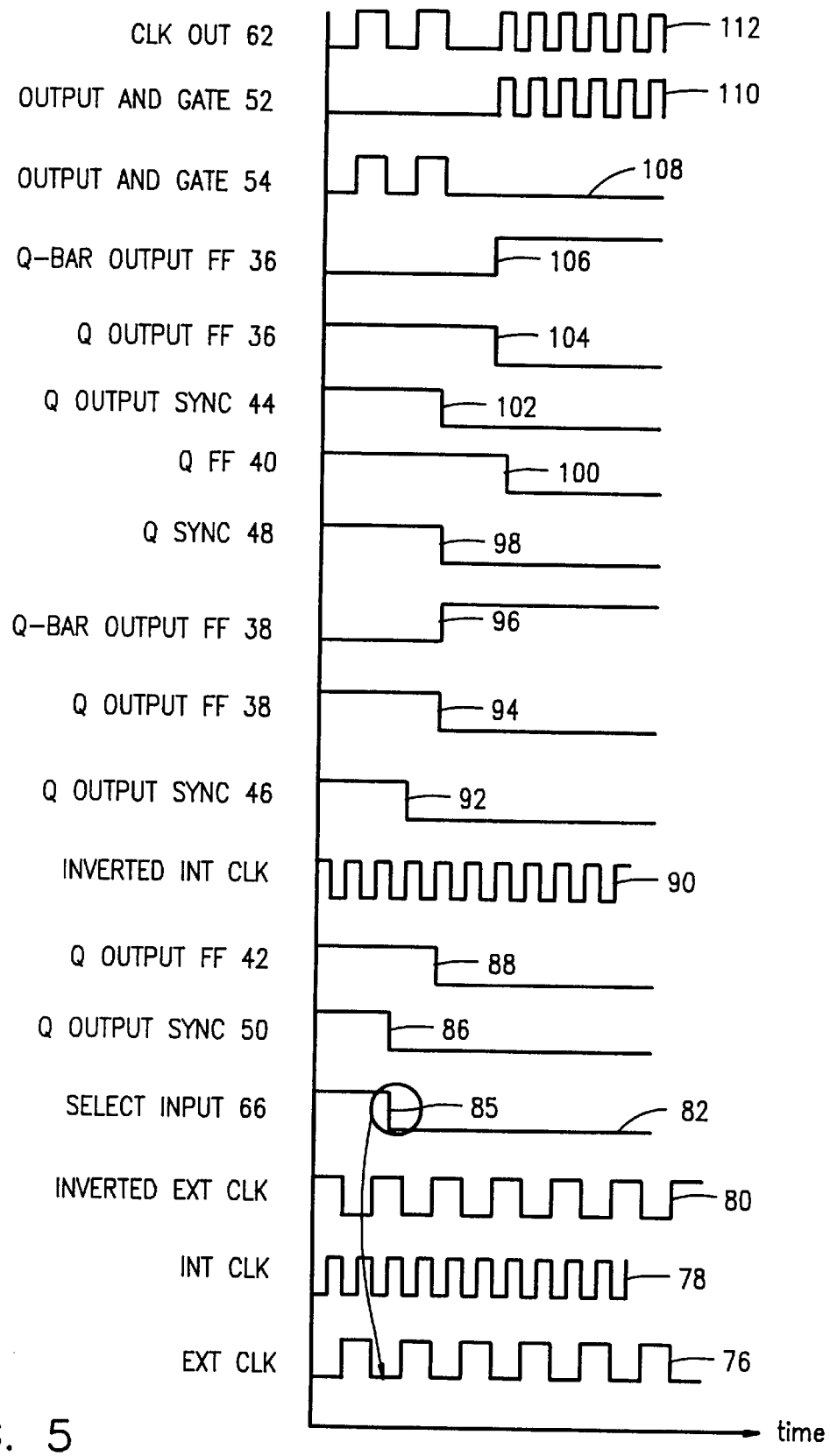
FIG. 5 shows a second timing diagram showing waveforms resulting at various locations within the embodiment of the present invention shown in FIG. 3.
Figure 6:
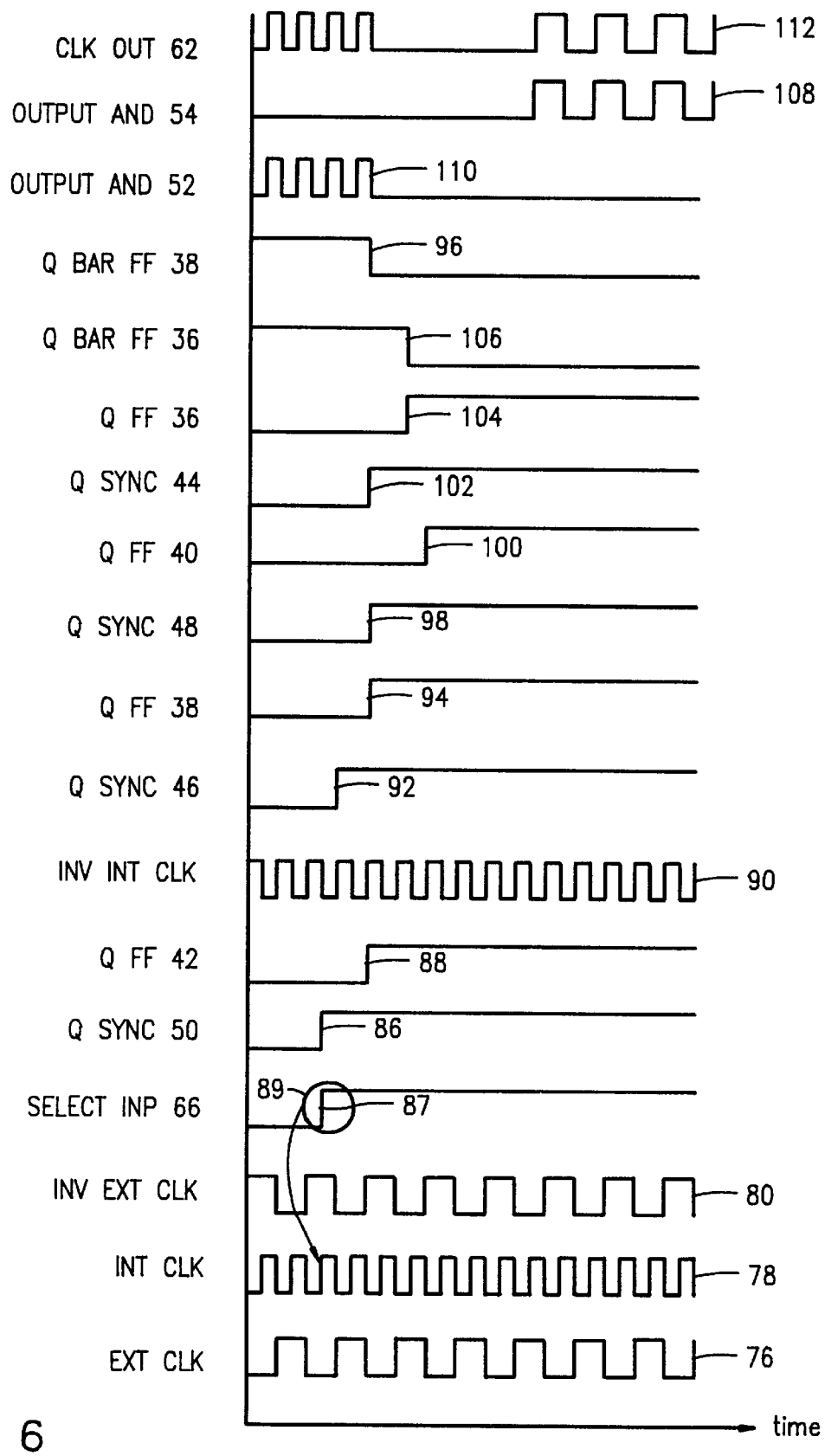
FIG. 6 shows a third timing diagram showing waveforms resulting at various locations within the embodiment of the present invention shown in FIG. 3.
Figure 7:
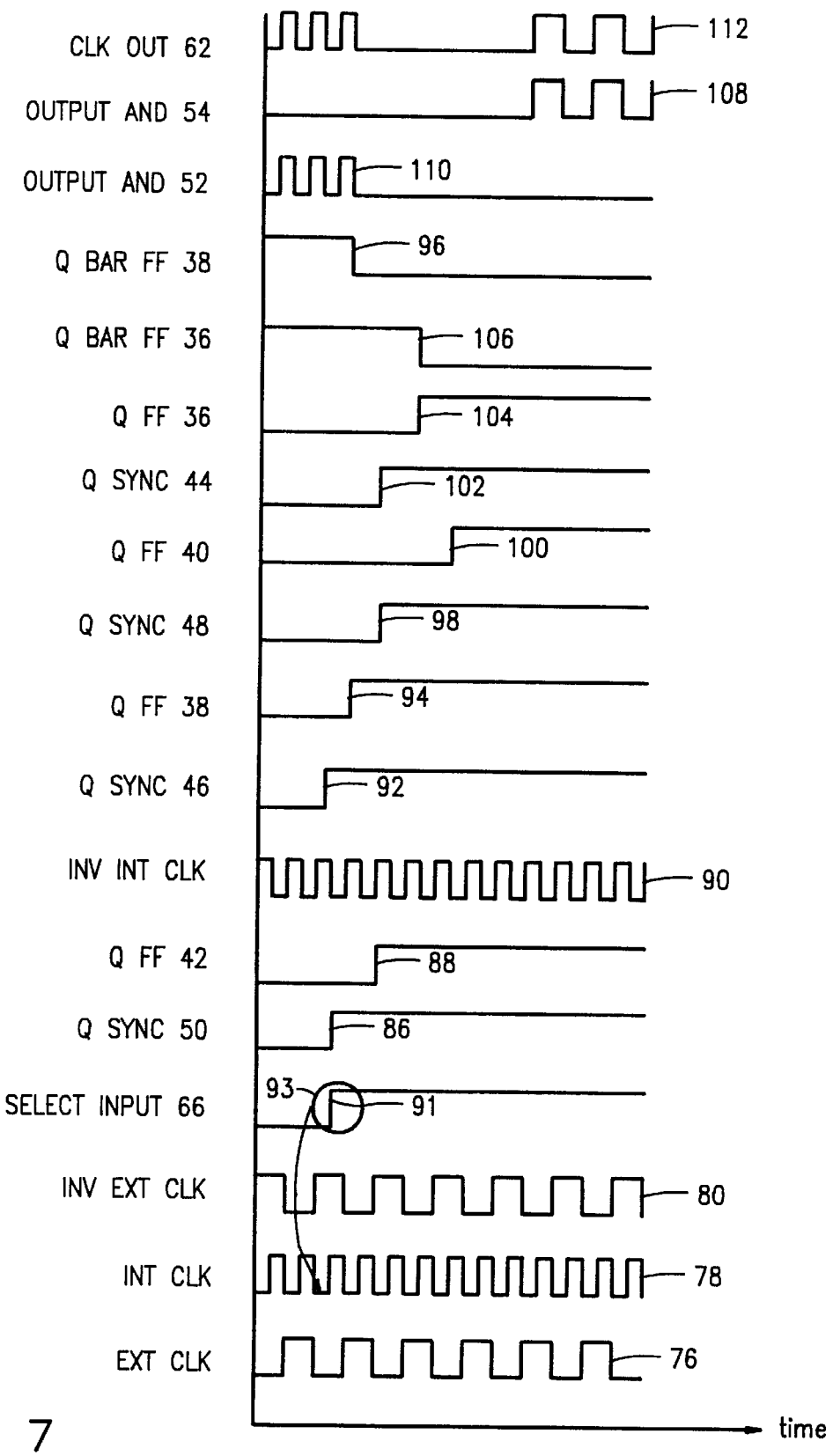
FIG. 7 shows a fourth timing diagram showing waveforms resulting at various locations within the embodiment of the present invention shown in FIG. 3.

The operation of circuit 34 will now be explained in conjunction with FIGS. 3–7. Depending upon the polarity of the select signal 66 the clk-out 62 which drives the Expansion bus interface (not shown) switches between the int-clock 68 and the ext-clk 70 or vice versa depending upon the initial state of select signal 66. For example, FIGS. 4 and 5 illustrate the switching from ext-clk 70 to int-clk 68 when select signal 66 is switched from a high to a low and FIGS. 6 and 7 illustrate the switching from int-clk 68 to ext-clk 70 when select signal 66 is switched from a low to a high. The requirement is to switch cleanly from one clock frequency domain to the other without any glitches or abrupt termination of the present clock which would cause metastability in the flip-flops or unwanted transition of states leading to data corruption in the data being transmitted or received.

Initially, at power-on-reset or during a hardware reset the four flip-flops, 36, 38, 40, 42 are all set to state high. The flip-flops 36 and 38 and the synchronizers 44 and 46 are associated with int-clk 68. The flip-flops 40 and 42 and the synchronizers 48 and 50 are associated with ext-clk 70. Therefore, after power-on-reset the clk-out 62 is a function of ext-clk 70 since the outputs, Q, of flip-flops 40 and 42 are both TRUE and AND GATE 54 gates the input signal from ext-clk 70 to the clk-out 62. The output of AND GATE 52 is low because both outputs, Q-bar, of flip-flops 36 and 38 are low. This prevents the input from int-clk 68 from being gated via AND GATE 52 to the clk-out 62. At this time an Expansion bus interface (not shown) can be accessed by drive software using the PCI clock cycles to read/write FLASH and EEPROM devices. When the select signal is deasserted to a low by a different clock in the device to start normal data transfer then the circuit 34 needs to disengage the input signal from ext-clk 70 and engage the input signal from int-clk 68. The select 66 is synchronized with the negative edge of the present clock source (in this case ext-clk 70). When select input 66 is deasserted to a low, the synchronized signal, Q from flip-flop 42 is used to disengage the ext-clk 70 input signal from being output from AND GATE 54. This is accomplished as follows. The deasserted signal (low) from select input 66 is input to synchronizer 50. The Q output of synchronizer 50 will change from a high to a low when the clock input to synchronizer 50 is high, that is, when the ext-clk 70 is low. The low at the Q output of synchronizer 50 will be communicated to the D input of flip-flop 42. The Q output from flip-flop 42 will change to a low when the clock input to flip-flop 42 changes from a low to a high, that is, a positive clock edge. When the Q output from flip-flop 42 is low and is communicated to AND GATE 54, the input from ext-clk 70 is prevented from being gated to the clk-out 62.

After the input from ext-clk 70 is disengaged from clk-out 62 as described above, the input from int-clk 68 is engaged by being gated to clk-out 62. This is accomplished as follows. As described above, the Q output of flip-flop 42 has become low. This low is communicated to the D input of synchronizer 44 and will change the state (in this case from a 1 to a 0) of the Q output of synchronizer 44 when the clock input to synchronizer 44 is high, that is, when the int-clk 68 is low. The Q output of synchronizer 44 is communicated to the D input of flip-flop 36 and will change the state of the Q-bar output (in this case from a 0 to a 1) of flip-flop 36 when the clock input to flip-flop 36 changes from a low to a high, that is, a positive clock edge, which is obtained from an inverted negative clock edge. This "1," at the Q-bar output of flip-flop 36, is an input to AND GATE 52. When the remaining input (other than the input from int-clk 68) to AND GATE 52 is also TRUE, the input from int-clk 68 will be gated to clk-out 62. The remaining input to AND GATE 52 becomes TRUE as follows. When the select input 66 is deasserted from a 1 to a 0 and is input to the D input of synchronizer 46, the Q output of synchronizer 46 will change to a low when the clock input to synchronizer 46 is high. The Q output of synchronizer 46 is input to the D input of flip-flop 38. The Q-bar output of flip-flop 38 will change to a 1 when the clock input to flip-flop 38 changes from a low to high, that is, on a positive clock edge. When both inputs to AND GATE 52 (other than the int-clk 68 input to AND gate 52) are TRUE, the int-clk 68 will be gated to the clk-out 62.

Referring now to FIG. 4, there is shown the waveforms at various locations within FIG. 3. Waveform 76 is the waveform of external clock (ext-clk) 70 and waveform 78 is the waveform of internal clock 68. Waveform 80 is the inverted external clock 70 that would be seen as inverted by inverter 74. Waveform 82 is the waveform that would be seen at select input 66. The remaining waveforms illustrate how the circuit shown in FIG. 3 functions when the select input 66 changes from a high to a low, illustrated at 84. FIG. 4 is an illustration of how the circuit shown in FIG. 3 functions when the select input 66 is deasserted, that is, changes from high to a low when the ext-clk 70 waveform 76 is at a high state indicated by circle and arrow 77. When select input 66 is deasserted as shown at 84 it is input to synchronizer 50 and because the clock input to synchronizer 50 is low (it is noted that the clock input to all of the flip-flops is the inverted clock signal from either ext-clk 70 or int-clk 68) the output of synchronizer 50 will not change until inverted ext-clk waveform 80 becomes high. The output of synchronizer 50 changes to a low as shown at 86 and is input to flip-flop 42. The output of flip-flop 42 will not flip until there is a positive clock edge, which in this case, is the inverted ext-clk waveform 80. The Q output of flip-flop 42 flips to a low as shown at 88 and is input to AND gate 54 and to the D input of synchronizer 44. The low state from flip-flop 42 serves to disengage the ext-clk 70 from clk-out 62. The select input 66 is also input to synchronizer 46. The output of synchronizer 46 will flip to a low when the clock input is either high or becomes high (in this case the clock input is the int-clk 68 inverted by inverter 72). The inverted int-clk waveform is shown at 90. The Q output of synchronizer 46 becomes low and is indicated at 92 when the inverted int-clk waveform 90 becomes high. The Q output of synchronizer 46 is input to flip-flop 38 which will flip when the clock input changes state from a low to a high. The change of state of flip-flop 38 is shown at 94 and is shown going from a high to a low. As is well known the Q-bar output will flip from a low to a high and is shown at 96 and is input to AND gate 52 which will cause int-clk 68 to be gated to clk-out 62 whenever the other inputs are TRUE. The Q output of flip-flop 38 is input to synchronizer 48 which will change state if and when the clock input is a high or changes to a high. The change of state of synchronizer 48 is shown at 98 and is shown going from a high to a low. The Q output of synchronizer 48 is input to flip-flop 40 which will change state when the clock edge input is positive and is indicated at 100 changing from a high to a low and is input to AND gate 54 which will cause ext-clk 70 to remain disengaged from clk-out 62. The output of flip-flop 42, as discussed above, is input to synchronizer 44 which will change state if and when the clock input is either high or changes to a high (and in this case the clock input is int-clk 68 inverted by inverter 72). The change of state of synchronizer 44 is indicated at 102. The output of synchronizer 44 is input to flip-flop 36 which will change state upon the next positive clock edge and the Q output is shown at 104 going from a high to a low. In this embodiment the Q output of flip-flop 36 is not used and the Q-bar output is shown going from a low to a high at 106. The Q-bar output of flip-flop 36 is input to AND gate 52 and allows the int-clk 68 input to AND gate 52 to be gated to clk-out 62. Waveform 108 is the output of AND gate 54 and illustrates the ext-clk 70 being disengaged from the output of AND gate 54. Waveform 110 is the output of AND gate 52 and illustrates the int-clk 68 being gated to clk-out 62 after ext-clk 68 is disengaged from clk-out 62. Waveform 112 illustrates the resultant waveform seen at clk-out 62.

Referring now to FIG. 5 there is shown the waveforms at various locations within FIG. 3. The analysis associated with FIG. 5 is similar to the analysis associated with FIG. 4 and like reference numerals are utilized to denote like waveforms or like components between the two figures. Waveform 76 is the waveform of external clock (ext-clk) 70 and waveform 78 is the waveform of internal clock 68. Waveform 80 is the inverted external clock that would be seen as inverted by inverter 74. Waveform 82 is the waveform that would be seen at select input 66. The remaining waveforms illustrate how the circuit shown in FIG. 3 functions when the select input 66 changes from a high to a low, illustrated at 84. FIG. 5 differs from FIG. 4 in that select input 66 changes from a high to a low, indicated at 85, at a time when the ext-clk 70 is at a low whereas in FIG. 4 select input 66 changed from a high to a low at a time when the ext-clk 70 was at a high. When select input 66 is deasserted as shown at 84 it is input to synchronizer 50 and because the clock input to synchronizer 50 is low (it is noted that the clock input to all of the flip-flops is the inverted clock signal from either ext-clk 70 or int-clk 68) the output of synchronizer 50 will not change until inverted ext-clk waveform 80 becomes high. The output of synchronizer 50 changes to a low as shown at 86 and is input to flip-flop 42. The output of flip-flop 42 will not flip until there is a positive clock edge, which in this case, is the inverted ext-clk waveform 80. The Q output of flip-flop 42 flips to a low as shown at 88 and is input to AND gate 54 and to the D input of synchronizer 44. The low state from flip-flop 42 serves to disengage the ext-clk 70 from clk-out 62. The select input 66 is also input to synchronizer 46. The output of synchronizer 46 will flip to a low whenever the clock input is either high or become high (in this case the clock input is the int-clk 68 inverted by inverter 72). The inverted int-clk waveform is shown at 90. The Q output of synchronizer 46 becomes low and is indicated at 92 when the inverted int-clk waveform 90 becomes high. The Q output of synchronizer 46 is input to flip-flop 38 which will flip when the clock input changes state from a low to a high. The change of state of flip-flop 38 is shown at 94 and is shown going from a high to a low. As is well known the Q-bar output will flip from a low to a high and is shown at 96 and is input to AND gate 52 which will cause int-clk 68 to be gated to clk-out 62 whenever the other inputs to AND GATE 52 are TRUE. The Q output of flip-flop 38 is input to synchronizer 48 which will change state if and when the clock input is a high or changes to a high. The change of state of synchronizer 48 is shown at 98 and is shown going from a high to a low. The Q output of synchronizer 48 is input to flip-flop 40 which will change state when the clock edge input is positive and is indicated at changing from a high to a low and is input to AND gate 54 which will cause ext-clk 70 to remain disengaged from clk-out 62. The output of flip-flop 42, as discussed above, is input to synchronizer 44 which will change state if and when the clock input is either high or changes to a high (and in this case the clock input is int-clk 68 inverted by inverter 72). The change of state of synchronizer 44 is indicated at 102. The output of synchronizer 44 is input to flip-flop 36 which will change state upon the next positive clock edge and the Q output is shown at 104 going from a high to a low. In this embodiment the Q output of flip-flop 36 is not used and the Q-bar output is shown going from a low to a high at 106. The Q-bar output of flip-flop 36 is input to AND gate 52 and allows the int-clk 68 input to AND gate 52 to be gated to clk-out 62. Waveform 108 is the output of AND gate 54 and illustrates the ext-clk 70 being disengaged from the output of AND gate 54. Waveform 110 is the output of AND gate 52 and illustrates the int-clk 68 being gated to clk-out 62 after ext-clk 68 is disengaged from clk-out 62. Waveform 112 illustrates the resultant waveform seen at clk-out 62 during the switching from the int-clk 68 to the ext-clk 70.

Referring now to FIG. 6 there is shown the waveforms at various locations within FIG. 3 and the analysis of FIG. 6 is similar to the analysis associated with FIGS. 4 and 5. Like numerals are used for like waveforms and like components between the figures. Waveform 76 is the waveform of external clock (ext-clk) 70 and waveform 78 is the waveform of internal clock (int-clk) 68. Waveform 80 is the inverted external clock that would be seen as inverted by inverter 74. Waveform 82 is the waveform that would be seen at select input 66. The remaining waveforms illustrate how the circuit shown in FIG. 3 functions when the select input 66 changes from a low to a high, illustrated at 87. FIG. 6 is an illustration of how the circuit shown in FIG. 3 functions when the select input 66 changes from low to high when the int-clk 68 is at a high state. This is illustrated by the circle and arrow 89. When select input 66 is asserted as shown at 87 the high value is input to synchronizer 50 and because the clock input to synchronizer 50 is high (it is noted that the clock input to all of the flip-flops is the inverted clock signal from either ext-clk 70 or int-clk 68) the output of synchronizer 50 will flip immediately. The output of synchronizer 50 changes to a high as shown at 86 and is input to flip-flop 42. The output of flip-flop 42 will not flip until there is a positive clock edge, which in this case, is the inverted ext-clk waveform 80. The Q output of flip-flop 42 flips to a high as shown at 88 and is input to AND gate 54 and to the D input of synchronizer 44. The high state from flip-flop 42 will allow AND gate 54 to gate the ext-clk 70 to clk-out 62 if the other inputs to AND gate 54 are TRUE. The select input 66 is also input to synchronizer 46. The output of synchronizer 46 will flip to a high when the clock input is either high or becomes high (in this case the clock input is the int-clk 68 inverted by inverter 72). The inverted int-clk 68 waveform is shown at 90. The Q output of synchronizer 46 becomes high and is indicated at 92 when the inverted int-clk waveform 90 becomes high. The Q output of synchronizer 46 is input to flip-flop 38 which will flip when the clock input changes state from a low to a high. The change of state of flip-flop 38 is shown at 94 and is shown going from a low to a high. As is well known the Q-bar output of flip-flop 38 will flip from a high to a low at the same instant of time as is shown at 96 and is input to AND gate 52 which will cause int-clk 68 to be disengaged from clk-out 62 if all the other inputs to AND gate 52 are TRUE. The Q output of flip-flop 38 is also input to synchronizer 48 which will change state if and when the clock input is a high or changes to a high. The change of state of synchrnonizer 48 is shown at 98 and is shown going from a low to a high. The Q output of synchronizer 48 is input to flip-flop 40 which will change state when the clock edge input is positive and is indicated at 100 as changing from a low to a high and is input to AND gate 54 which will allow ext-clk 70 to be gated to clk-out 62 when the other inputs to AND gate 54 are TRUE. The output of flip-flop 42, as discussed above, is input to synchronizer 44 which will change state if and when the clock input is either high or changes to a high (and in this case the clock input is int-clk 68 inverted by inverter 72). The change of state of synchronizer 44 is indicated at 102. The output of synchronizer 44 is input to flip-flop 36 which will change state upon the next positive clock edge and the Q output of flip-flop 36 is shown at 104 going from a low to a high. In this embodiment the Q output of flip-flop 36 is not used and the Q-bar output is shown going from a high to a low at 106. The Q-bar output of flip-flop 36 is input to AND gate 52 and prevents the int-clk 68 input to AND gate 52 from being gated to clk-out 62. Waveform 108 is the output of AND gate 54 and illustrates the ext-clk 70 being engaged or gated through AND gate 54. Waveform 110 is the output of AND gate 52 and illustrates the int-clk 68 being disengaged from clk-out 62. Waveform 112 illustrates the resultant waveform seen at clk-out 62 during the switching from the int-clk 68 to the ext-clk 70.

Referring now to FIG. 7 there is shown the waveforms at various locations within FIG. 3 and is similar to the analysis associated with FIGS. 4–6 wherein like numerals are used for like waveforms and like components between the figures. The analysis associated with FIG. 7 is similar to the analysis associated with FIG. 6 with the exception that the select input 66 is asserted at 91, a time when the int-clk 68 waveform is at a low as indicated by circle and arrow at 93.

The foregoing description of the preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications which are suited to the particular use contemplated. All such modifications and variations are within the scope of the invention as determined by the appended claims when interpreted in accordance with the breadth to which they are fairly, legally, and equitably entitled.

What we claim is:

1. A circuit for switching between an input from a first clock and an input from a second clock, comprising:

a select input;

an output circuit comprising a first three input AND GATE having a first input from the first clock and a second three input AND GATE having a first input from the second clock;

a first circuit portion associated with the first clock comprising a first synchronizer having an input directly from the select input and a first flip-flop having an input from the first synchronizer and having an output directly to the first three input AND GATE wherein when the select input to the first synchronizer is HIGH, the output from the first flip-flop to the first three input AND GATE is LOW and thus disengages the first clock from the output circuit and wherein the first synchronizer and first flip-flop have a clock input from the first clock, wherein the clock input from the first clock is inverted and wherein the outputs of the first synchronizer and first flip-flop are output on the next negative leading edge of the first clock; and a second circuit portion associated with the second clock comprising a second synchronizer having an input directly from the select input and a second flip-flop having an input from the second synchronizer and having an output directly to the second three input AND GATE wherein when the select input to the second synchronizer is HIGH, the output from the second flip-flop to the second three input AND GATE is HIGH and thus allows the second clock to be engaged to the output circuit when the third input to the second AND GATE is HIGH and wherein the second synchronizer and second flip-flop have a clock input from the second clock, wherein the clock input from the second clock is inverted and wherein the outputs of the second synchronizer and second flip-flop are output on the next negative leading edge of the second clock.

2. The circuit of claim 1 wherein:

the first circuit portion further comprises a third synchronizer having an input from the second flip-flop and an output to a third flip-flop having an output directly to the first three input AND GATE wherein when the select input is HIGH the output to the first three input AND GATE is LOW and wherein the third synchronizer and third flip-flop have a clock input from the first clock, wherein the clock input from the first clock is inverted and wherein the outputs of the third synchronizer and third flip-flop are output on the next negative leading edge of the first clock; and the second circuit portion further comprises a fourth synchronizer having an input from the first flip-flop and an output to a fourth flip-flop having an output directly to the second three input AND GATE wherein when the select input is HIGH the output to the second three input AND GATE is HIGH thus engaging the second clock to the output circuit when the select input is HIGH and wherein the fourth synchronizer and fourth flip-flop have a clock input from the second clock, wherein the clock input from the second clock is inverted and wherein the outputs of the fourth synchronizer and fourth flip-flop are output on the next negative leading edge of the second clock.

3. The circuit of claim 2, further comprising a reset input.

4. The circuit of claim 3, wherein the reset input causes the first clock input to be engaged to the output circuit.

5. The circuit of claim 4, wherein the reset input is input to the first, second, third, and fourth flip-flops.

6. The circuit of claim 5, wherein the reset input is input to a set input of the first, second, third, and fourth flip-flops.

7. The circuit of claim 6, wherein the output circuit further comprises the first and second three input AND gates each having an output to a NOR gate.

8. The circuit of claim 7, wherein the output circuit further comprises as least one inverter connected to the output of the NOR gate and an output terminal.

* * * * *